US011483345B2

(12) United States Patent
Barrett et al.

(10) Patent No.: US 11,483,345 B2
(45) Date of Patent: Oct. 25, 2022

(54) PREVENTION OF MALICIOUS AUTOMATION ATTACKS ON A WEB SERVICE

(71) Applicant: Cequence Security, Inc., Sunnyvale, CA (US)

(72) Inventors: Michael Barrett, Berkeley, CA (US); Shreyans Mehta, Los Altos, CA (US); Ameya Talwalkar, Saratoga, CA (US)

(73) Assignee: Cequence Security, Inc., Sunnyvale, CA (US)

( * ) Notice: Subject to any disclaimer, the term of this patent is extended or adjusted under 35 U.S.C. 154(b) by 192 days.

(21) Appl. No.: 15/835,765

(22) Filed: Dec. 8, 2017

(65) Prior Publication Data
US 2018/0167412 A1 Jun. 14, 2018

Related U.S. Application Data

(60) Provisional application No. 62/431,681, filed on Dec. 8, 2016.

(51) Int. Cl.
*H04L 29/06* (2006.01)
*G06F 21/53* (2013.01)
(Continued)

(52) U.S. Cl.
CPC .......... *H04L 63/1491* (2013.01); *G06F 21/53* (2013.01); *H04L 63/1425* (2013.01); *H04L 63/1458* (2013.01); *H04L 67/563* (2022.05)

(58) Field of Classification Search
CPC ............ H04L 63/1491; H04L 63/1425; H04L 63/1458; G06F 21/53
See application file for complete search history.

(56) References Cited

U.S. PATENT DOCUMENTS 9,148,424 B1 * 9/2015 Yang ..................... H04L 63/20
9,350,748 B1 5/2016 McClintock et al.
(Continued)

FOREIGN PATENT DOCUMENTS

EP 2713581 A1 4/2014
JP 2006-195559 A 7/2006
(Continued)

OTHER PUBLICATIONS

Notification of Transmittal of the International Search Report and the Written Opinion of the International Searching Authority, or the Declaration of PCT/US2017/065351, dated Feb. 2, 2018, 8 pages.
(Continued)

*Primary Examiner* — Ali S Abyaneh
*Assistant Examiner* — Zoha Piyadehghibi Tafaghodi (57) ABSTRACT

Techniques to facilitate prevention of malicious attacks on a web service are disclosed herein. In at least one implementation, a computing system intercepts a web request directed to a web server providing the web service. The computing system identifies whether or not the web request is malicious. When the web request is identified as malicious, the computing system redirects the web request to an isolated mitigation server configured to mimic responses of the web server. The isolated mitigation server processes the web request to generate artificial content based on the web request that appears to be genuine content provided by the web server, and presents the artificial content in response to the web request.

20 Claims, 6 Drawing Sheets

(51) Int. Cl.
*H04L 29/08* (2006.01)
*H04L 9/40* (2022.01)
*H04L 67/563* (2022.01)

(56) References Cited

U.S. PATENT DOCUMENTS

| | | | |
|---|---|---|---|
| 2006/0147043 A1* | 7/2006 | Mann | H04L 41/0893 380/270 |
| 2007/0261112 A1* | 11/2007 | Todd | G06F 21/577 726/11 |
| 2008/0282339 A1 | 11/2008 | Nakae et al. | |
| 2009/0037997 A1* | 2/2009 | Agbabian | H04L 63/166 726/10 |
| 2010/0192223 A1 | 7/2010 | Ismael et al. | |
| 2011/0247072 A1* | 10/2011 | Staniford | H04L 63/1416 726/24 |
| 2013/0117817 A1* | 5/2013 | Gantman | H04L 63/1466 726/4 |
| 2013/0160120 A1* | 6/2013 | Malaviya | G06Q 30/0244 726/23 |
| 2014/0096229 A1* | 4/2014 | Burns | H04L 63/1491 726/15 |
| 2014/0283028 A1* | 9/2014 | Yu | H04L 63/1466 726/22 |
| 2014/0344925 A1 | 11/2014 | Muthiah et al. | |
| 2015/0067866 A1* | 3/2015 | Ibatullin | G06F 21/554 726/25 |
| 2015/0326588 A1 | 11/2015 | Vissamsetty et al. | |
| 2016/0028764 A1* | 1/2016 | Vasseur | H04L 63/1416 726/23 |
| 2017/0078326 A1* | 3/2017 | Child | H04L 63/1483 |
| 2017/0104785 A1* | 4/2017 | Stolfo | H04L 63/1491 |
| 2017/0126718 A1* | 5/2017 | Baradaran | H04L 63/0281 |
| 2017/0195353 A1* | 7/2017 | Taylor | H04L 63/1425 |

FOREIGN PATENT DOCUMENTS

| | | |
|---|---|---|
| JP | 2008-152791 A | 7/2008 |
| WO | 2005/048522 A1 | 5/2005 |
| WO | 2005048522 A1 | 5/2005 |
| WO | 2016/031103 A1 | 3/2016 |
| WO | 2016031103 A1 | 3/2016 |

OTHER PUBLICATIONS

European Office Action for EP Application No. 17878379.1, dated Oct. 8, 2021; 7 pages.

* cited by examiner

PREVENTION OF MALICIOUS AUTOMATION ATTACKS ON A WEB SERVICE

RELATED APPLICATIONS

This application claims the benefit of, and priority to, U.S. Provisional Patent Application No. 62/431,681, entitled "PREVENTION OF MALICIOUS AUTOMATION ATTACKS ON A WEB SERVICE", filed Dec. 8, 2016, which is hereby incorporated by reference in its entirety for all purposes.

TECHNICAL BACKGROUND

Web servers that provide web services are often subject to automated attacks, such as using stolen credentials to fraudulently access the service, brute-force attacks that try several username and password combinations to gain access, registering fake accounts, scraping websites to harvest web data, and others. Such velocity attacks typically require a large number of transactions with the web service in a very short period of time, and commonly used web browsers are prohibitively slow for such large-scale and high-speed communications. Instead, attackers use a wide variety of attack tools, ranging from simple shell scripts to sophisticated custom tools designed to speed up transactions.

Various types of network security devices work to protect web services and their components from being attacked by malicious actors, such as firewalls, intrusion prevention systems, and the like. Such devices inspect network traffic at varying degrees of depth, typically by matching incoming traffic data with a library of patterns and network protocol analyzers. Security researchers typically update this pattern library continuously based on analysis of malware behavior at the network level. Typically, when traditional inline securities technologies detect malicious behavior, they simply block the connection in an attempt to thwart the attacker. Unfortunately, the attacker may then respond by changing the Internet Protocol (IP) address used for the connection or by employing a different attack tool, subjecting the web service to further attack.

OVERVIEW

A method to facilitate prevention of malicious attacks on a web service is disclosed. The method comprises intercepting a web request directed to a web server providing the web service and identifying whether or not the web request is malicious. The method further comprises, when the web request is identified as malicious, redirecting the web request to an isolated mitigation server configured to mimic responses of the web server. The method further comprises, in the isolated mitigation server, processing the web request to generate artificial content based on the web request that appears to be genuine content provided by the web server, and presenting the artificial content in response to the web request.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

A website is typically comprised of a reverse proxy or load balancer, a cluster of web server instances, and a database backend that may be queried for account credential verification and other account-specific information. When a web client sends a request to the website, the reverse proxy routes the request to one of the web server instances and the web server performs user authentication and serves user-specific content through the database backend. When an automated attack hits the website, traditional network security measures might block the traffic from the originating IP address, if they are able to detect the attack. This blocking action tips off the attacker to the mitigation effort since the attack tool is then prevented from connecting to the website. As a result, the attacker may respond by changing the IP address through alternation of the proxy server, virtual private network (VPN) connection, cloud provider instance, or some other aspects of the connection used in the attacks in an attempt to bypass the blocked connection. Since the attacker is able to quickly resume the attack in this manner, the traditional mitigation mechanism of blocking the connections is rendered largely ineffective. However, with the techniques disclosed herein, websites do not need to block web requests originating from automation attacks. Instead, malicious requests are served with fake web content, without interacting with or impacting the load on the real web servers and the databases.

Implementations are disclosed herein to facilitate prevention of malicious attacks on a web service. In at least one implementation, a redirection system intercepts a web request directed to a web server providing the web service, and identifies whether or not the web request is malicious. In some examples, the web request may be identified as malicious by the redirection system itself, or this determination may be offloaded to one or more systems, processes, modules, servers, and the like to process and analyze information associated with the request and the requesting client to identify a malicious request. When the web request is identified as malicious, the web request is redirected to an isolated mitigation server configured to mimic responses of the web server. The isolated mitigation server then processes the web request to generate artificial content that appears to be genuine content provided by the web server and presents the artificial content in response to the web request. Consequently, the attacker is duped into believing that the artificial content received from the mitigation server is a genuine response from the web server, and therefore remains unaware that any mitigation effort has taken place. Additionally, because the mitigation server is isolated from the web server, no additional interactions with or impact on the web server is caused by either the malicious web request or the artificial content generated and transferred by the mitigation server.

Figure 1:
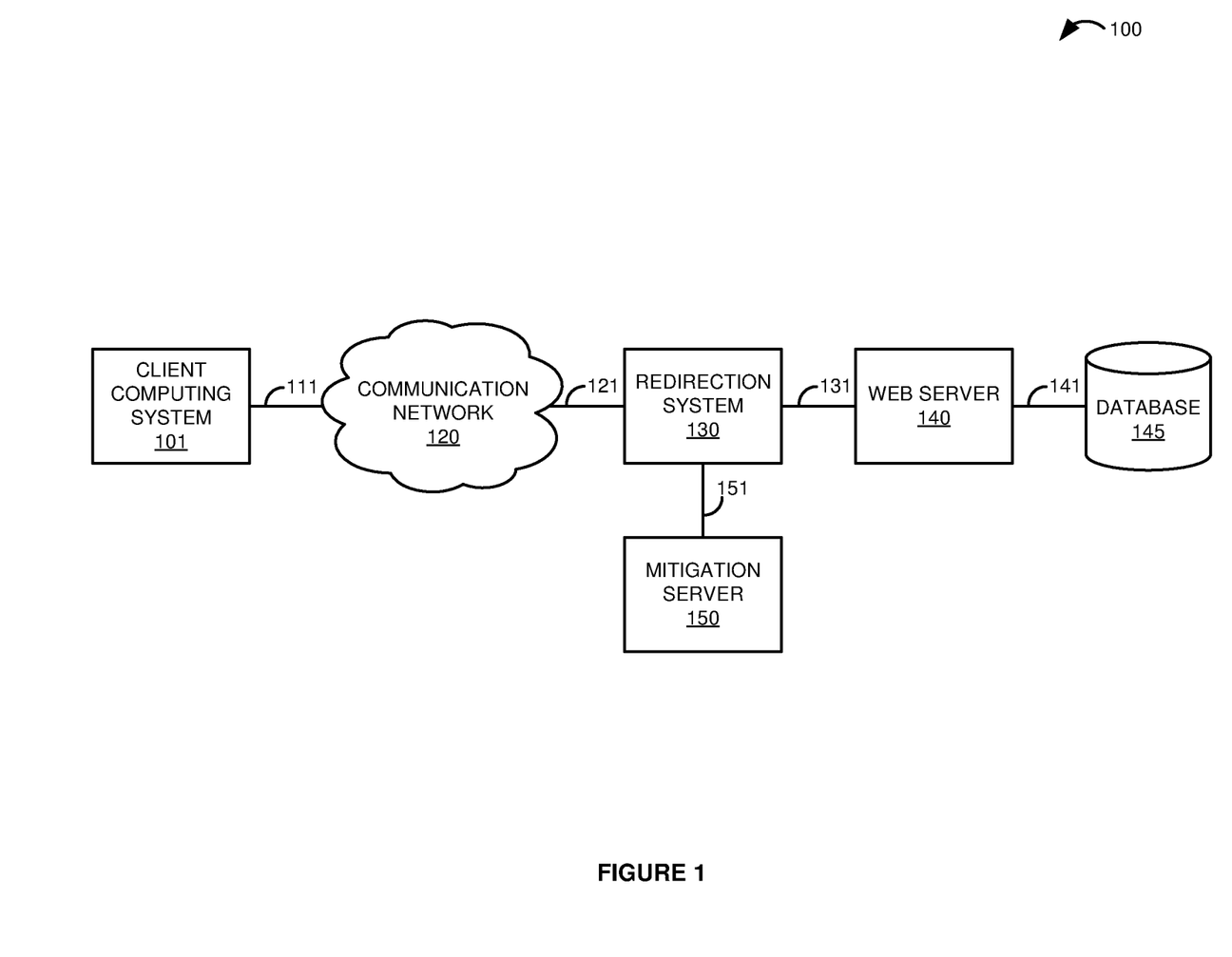
FIG. 1 is a block diagram that illustrates a communication system in an exemplary embodiment.

Referring now to FIG. 1, a block diagram of communication system 100 is illustrated. Communication system 100 includes client computing system 101, communication network 120, redirection system 130, web server 140, database 145, and mitigation server 150. Client computing system 101 and communication network 120 communicate over communication link 111. Communication network 120 and redirection system 130 are in communication over communication link 121. Redirection system 130 and web server 140 communicate over communication link 131, while web server 140 and database 145 are in communication over communication link 141. Redirection system 130 and mitigation server 150 communicate over communication link 151. In at least one implementation, redirection system 130 and mitigation server 150 are described as providing separate functionality, but their functions could be combined into a single redirection and mitigation system in some implementations. For example, redirection system 130 and mitigation server 150 could be included as different modules within the same hardware apparatus, such that redirection system 130 is executed by the same computing hardware as mitigation server 150. However, redirection system 130 and mitigation server 150 could also physically reside on two separate hardware appliances within communication system 100 in some implementations. For example, in at least one implementation, redirection system 130 and mitigation server 150 could be run on separate dedicated central processing unit, operating system, and memory containers. An exemplary operation of communication system 100 will now be described with respect to FIG. 2.

Figure 2:
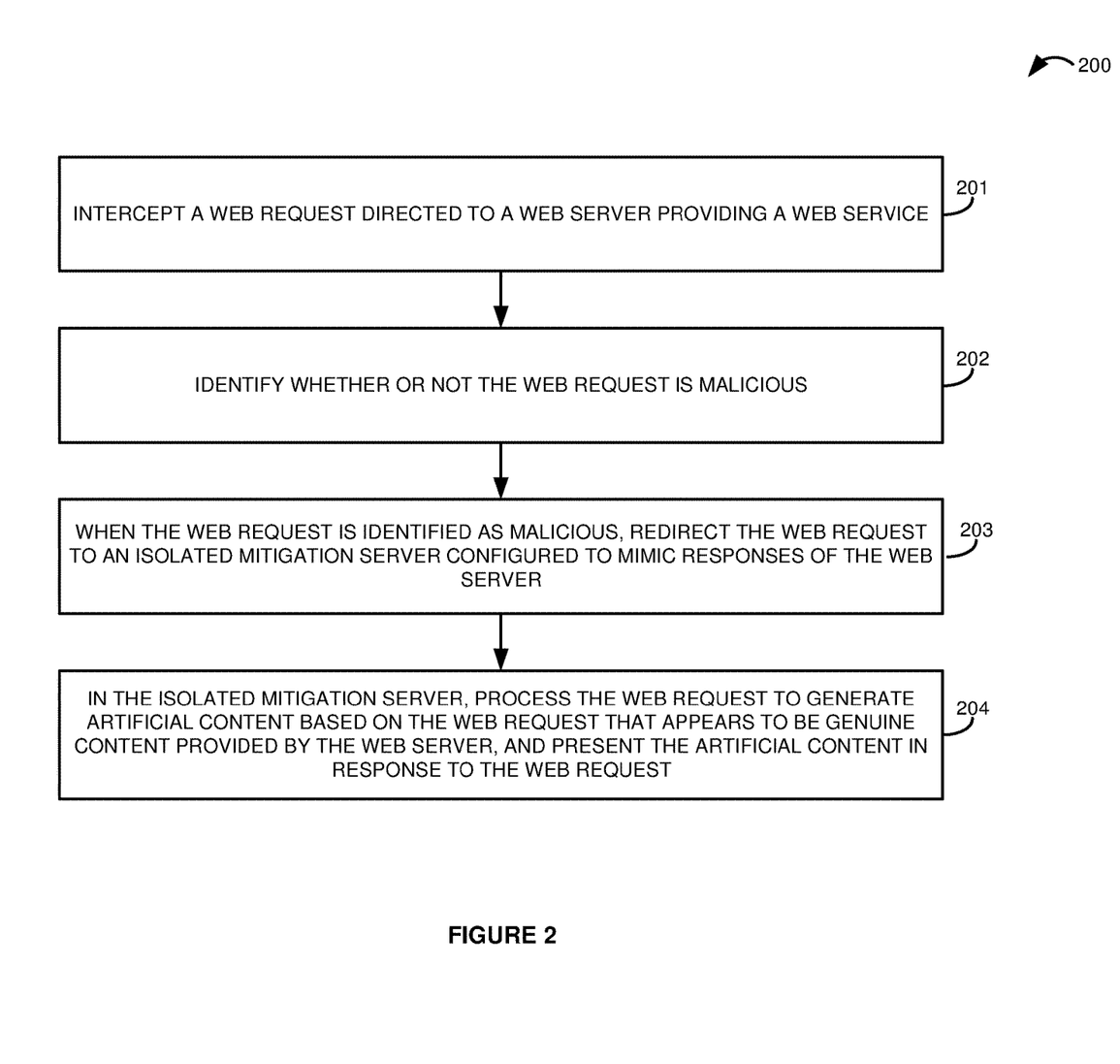
FIG. 2 is a flow diagram that illustrates an operation of the communication system in an exemplary embodiment.

FIG. 2 is a flow diagram that illustrates an operation of communication system 100 in an exemplary implementation. The operation 200 shown in FIG. 2 may also be referred to as mitigation process 200 herein. The steps of the operation are indicated below parenthetically. The following discussion of operation 200 will proceed with reference to the elements of FIG. 1 in order to illustrate its operations, but note that the details provided in FIG. 1 are merely exemplary and not intended to limit the scope of process 200 to the specific implementation of FIG. 1.

Operation 200 may be employed to facilitate prevention of malicious attacks on a web service. As shown in the operational flow of FIG. 2, redirection system 130 intercepts a web request directed to web server 140 providing a web service (201). In this example, the web request is transmitted by client computing system 101. Typically, the web request comprises instructions to direct a web service to execute a function on web server 140, retrieve data from database 145, or store data transferred by client computing system 101 in database 145. For example, the web service request could comprise a query, message, notification, command, request, instruction, or any other communications between client computing system 101 and web server 140, including combinations thereof. In some implementations, redirection system 130 could comprise a network security appliance that monitors network traffic and mitigates detected security threats. For example, redirection system 130 could comprise an active inline security device configured to intercept network traffic en route to its final destination, which could be web server 140, another computing system, a cloud server, a mobile application server, an application programming interface (API) flow, or any other computing resource. In some examples, redirection system 130 could be included in a reverse proxy and/or load balancer used in the provision of a web service, where an active inline security module of redirection system 130 receives and analyzes network traffic from a plurality of users, such as client computing system 101, before delivering it to the web service.

Redirection system 130 identifies whether or not the web request is malicious (202). In some examples, the web request may be identified as malicious by redirection system 130 using self-derived and/or external intelligence. For example, redirection system 130 could identify whether or not the web request is malicious by analyzing information associated with the web request and/or the client computing system 101 that made the request in order to identify the web request as malicious. However, in other examples, this determination may be offloaded to one or more systems, processes, modules, servers, and the like to process and analyze information associated with the request and the requesting client to identify a malicious request. The identification of the web request as malicious could also be based on a series of requests in the web traffic associated with the same client computing system 101 or user. For example, in at least one implementation, a passive analysis system could receive a copy of the web traffic and perform deep analysis thereon to detect malicious patterns of behavior. The passive analysis system may detect large velocity attacks by analyzing behavioral patterns, which are typically identified in streams of packets over time. Some exemplary behavior that may be identified includes the length of time a connection persists, transitions from idle to active on a connection, frequency of requests sent from an endpoint, header information associated with a request, or any other contextual or behavioral data observable from web requests submitted by client computing system 101.

Regardless of whether or not redirection system 130 or some other external system or systems are involved in identifying the web request as malicious, this determination could be based on several different criteria and considerations. In at least one implementation, redirection system 130 could identify whether or not the web request is malicious by processing connection-level information. For example, the identification of web requests as malicious could be based on connection-level information and behavior, such as Transmission Control Protocol (TCP)/IP and secure socket layer (SSL) characteristics, the number of connections the client creates, the number of requests sent per connection, the length of time each connection persists, and any other data that can be observed from the interactions of client computing system 101 and the web request. Further, in some implementations, redirection system 130 could identify whether or not the web request is malicious by processing hypertext transfer protocol (HTTP) headers associated with the web request. For example, the determination of a malicious web request could be based on HTTP headers associated with the web request, including the order of fields in the request header, the presence or absence of particular fields, the values of the fields, such as the protocols, languages, media types, compression algorithms, and other features that the client supports, new capabilities that appear in newer versions of a browser that were not present in older versions, the list of cipher suites transmitted by client 101 during HTTP Secure (HTTPS) session establishment, and any other information that can be gleaned from the request header. IP address whitelists, blacklists, regular expressions, fingerprints of behavior, data models, or any other information that may be matched against similar traffic can also be employed in indentifying malicious requests, including combinations thereof. In some implementations, user/client behavioral information could be considered, such as the timing of clicks, keystrokes, and other user inputs, page navigations, page scrolling, content requests, and the like. Of course, the above criteria and considerations are merely exemplary and non-limiting, and any other information that may be gleaned from the web request and/or the requesting client computing system 101 that may be used to identify whether or not the web request is malicious is possible and within the scope of this disclosure.

When the web request is identified as malicious, redirection system 130 redirects the web request to isolated mitigation server 150 configured to mimic responses of web server 140 (203). Effectively, redirection system 130 prevents the web request from hitting web server 140 by redirecting the request to mitigation server 150, which is isolated from web server 140. Accordingly, web server 140 is not burdened by the malicious web request, and the security of the data stored in database 145 remains intact.

The isolated mitigation server 150 processes the web request to generate artificial content based on the web request that appears to be genuine content provided by web server 140, and presents the artificial content in response to the web request (204). Mitigation server 150 comprises an active application that attempts to mimic the responses of web server 140. In some examples, mitigation server 150 could comprise or be referred to as a honey trap module. When generating the artificial content based on the web request, mitigation server 150 attempts to mimic the interactions of client computing system 101 with web server 140, without interacting with the real web server 140 or database 145. Mitigation server 150 may also attempt to mimic different behaviors based on the web page targeted by the malicious web request, and also tailor the behavioral outcomes based on the attack type. In some implementations, mitigation server 150 could process the web request to generate the artificial content based on the web request by generating the artificial content based on an attack type associated with the web request. For example, in at least one implementation, the attack type associated with the web request could comprise a credential attack, and generating the artificial content based on the attack type could comprise generating a false successful login page. For example, if the web request is submitting credentials to a login page of a website, mitigation server 150 could generate the artificial content by mimicking failed or successful login pages that would be provided by web server 140. Based on this credential attack type, the mitigation server 150 could present the artificial content as some false successful login pages along with failed login pages, but the false successful login pages would not actually correlate to valid user credentials. If the attacker later tries to use the credentials to which mitigation server 150 responded with the false successful login pages, these credentials will not actually work to login to the web sever 140. Other attack types that the artificial content could be generated based on include account password reset attacks, new account creations, automated shopping cart checkout attempts, or any other attacks on a web service. In some implementations, mitigation server 150 could process the web request to generate the artificial content based on the web request by generating the artificial content based on a type of web page targeted by the web request. For example, if the attacker attempts to access a password reset page, mitigation server 150 could mimic the password reset page that would be served by web server 140. Similarly, mitigation server 150 could mimic a new account creation flow for an account registration page, or an e-commerce shopping cart checkout flow when a user attempts to purchase items on a site using automation.

In some implementations, mitigation server 150 could process the web request to generate the artificial content based on the web request by generating the artificial content using a page template associated with a web page targeted by the web request. For example, mitigation server 150 could be configured with page templates for each of the web pages served by web server 140, which provide a skeleton of the page structures and identify areas where data values may be filled in by mitigation server 150. Accordingly, in at least one implementation, mitigation server 150 could generate the artificial content using the page template associated with the web page targeted by the web request by filling in values in the page template with false information to dynamically generate the artificial content. For example, mitigation server 150 could automatically generate the artificial content based on the web request by randomly filling in HTML values in the page templates with false information for the pages associated with the web request.

In some implementations, the isolated mitigation server 150 could be configured to mimic the responses of web server 140 based on observations of legitimate behavior associated with web server 140. For example, redirection system 130 may interact with web server 140 to observe and learn legitimate behavior of web server 140, such as site-specific behaviors and responses of web server 140, and provide the legitimate behavior of web server 140 to mitigation server 150 so that it can generate artificial content that mimics those behaviors. Other techniques of mitigation server 150 processing the web request to generate the artificial content that appears to be genuine content provided by web server 140 are possible and within the scope of this disclosure. Further, the techniques are not limited to web pages and HTML, but work equally well for mobile applications, API call flows, and any other web service.

Advantageously, malicious web requests are intercepted and redirected to mitigation server 150, which generates and presents artificial content in response to the web request. By operating transparently and serving artificial content that appears to be genuine content provided by the web server, the client computing system 101 and the user receive no indication that the redirection and mitigation effort has occurred. In this manner, redirection system 130 and mitigation server 150 work to fool attackers into thinking that their attacks are actually working, without providing any valid or sensitive information to the attackers. Further, these techniques help to protect web server 140 from distributed denial-of-service (DDoS) attacks since the web requests no longer actually reach web server 140, but are handled by isolated mitigation server 150.

Figure 3:
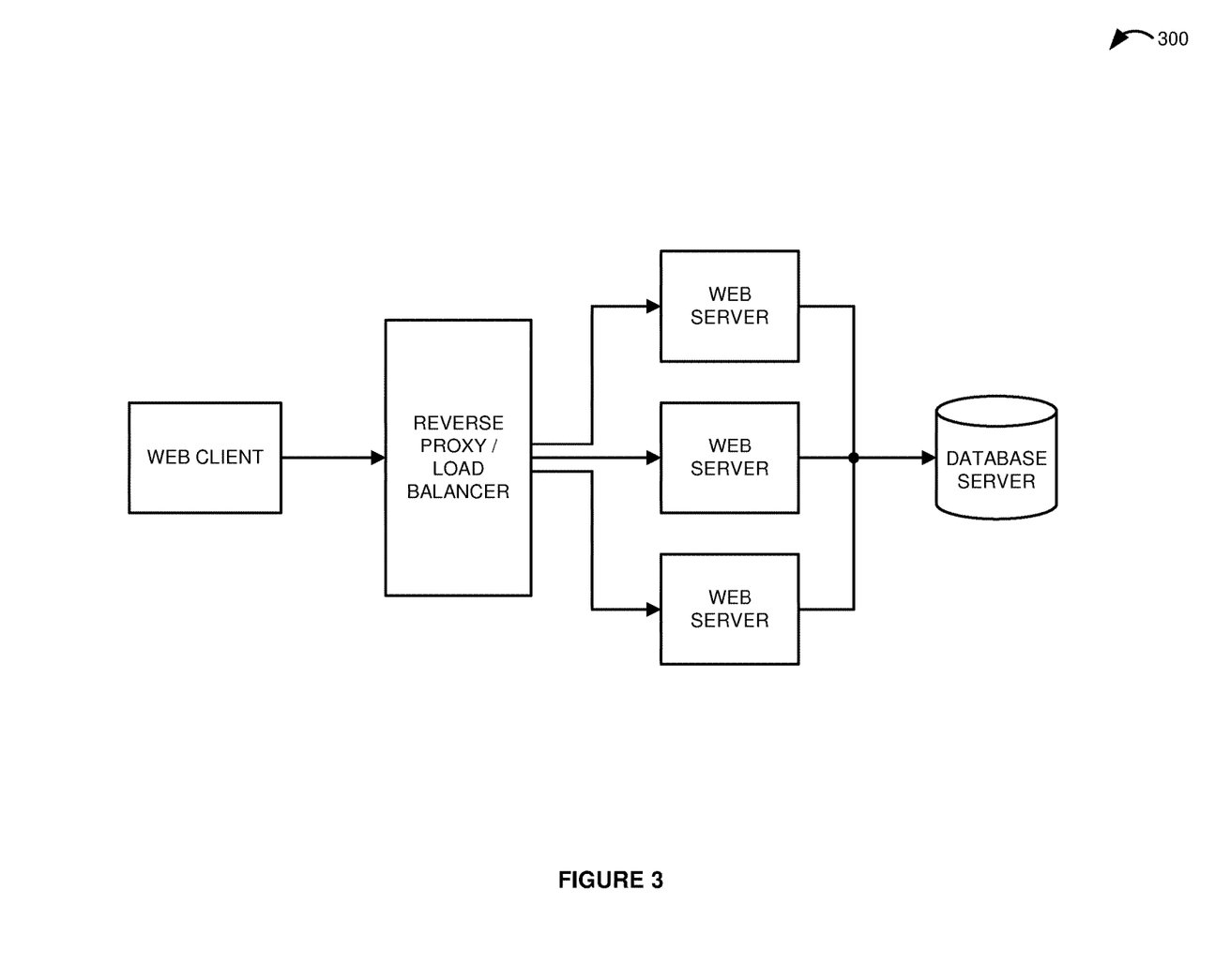
FIG. 3 is a block diagram that illustrates an operation of a communication system.

Referring now to FIG. 3, a block diagram is illustrated of an operation of communication system 300 in an exemplary embodiment. Communication system 300 includes a web client, a reverse proxy/load balancer, three web servers, and a database. Communication system 300 provides an example of a typical website comprised of a reverse proxy/ load balancer, a cluster of web server instances, and a database backend to query credentials and other account-specific information. In operation, when a web client submits a request to the website, the reverse proxy routes the request to one of the web server instances, and then the receiving web server performs user authentication and serves user-specific content through the database backend. However, malicious users deploy automated attacks that attempt to take over user accounts using stolen credentials, create fraudulent accounts, reset passwords, scrape personally identifiable information, and other harmful actions. When the automated attacks hit the website, traditional inline security technologies like firewalls, web application firewalls, intrusion prevention systems, and the like simply block the traffic from the originating IP address, assuming these measures are able to detect the attack. Once the attack tool stops working because it can no longer connect to the site under attack, the malicious user is tipped off to the mitigation effort and simply changes the IP address used for the attack by changing the proxy server, VPN, cloud provider instance, or some other properties of the connection. Additionally or alternatively, the attacker may also switch attack tools. Either way, the attack is resumed almost immediately, rendering the connection blocking techniques largely ineffective. An exemplary technique for mitigating malicious attacks on a web service will now be described with respect to FIG. 4.

Figure 4:
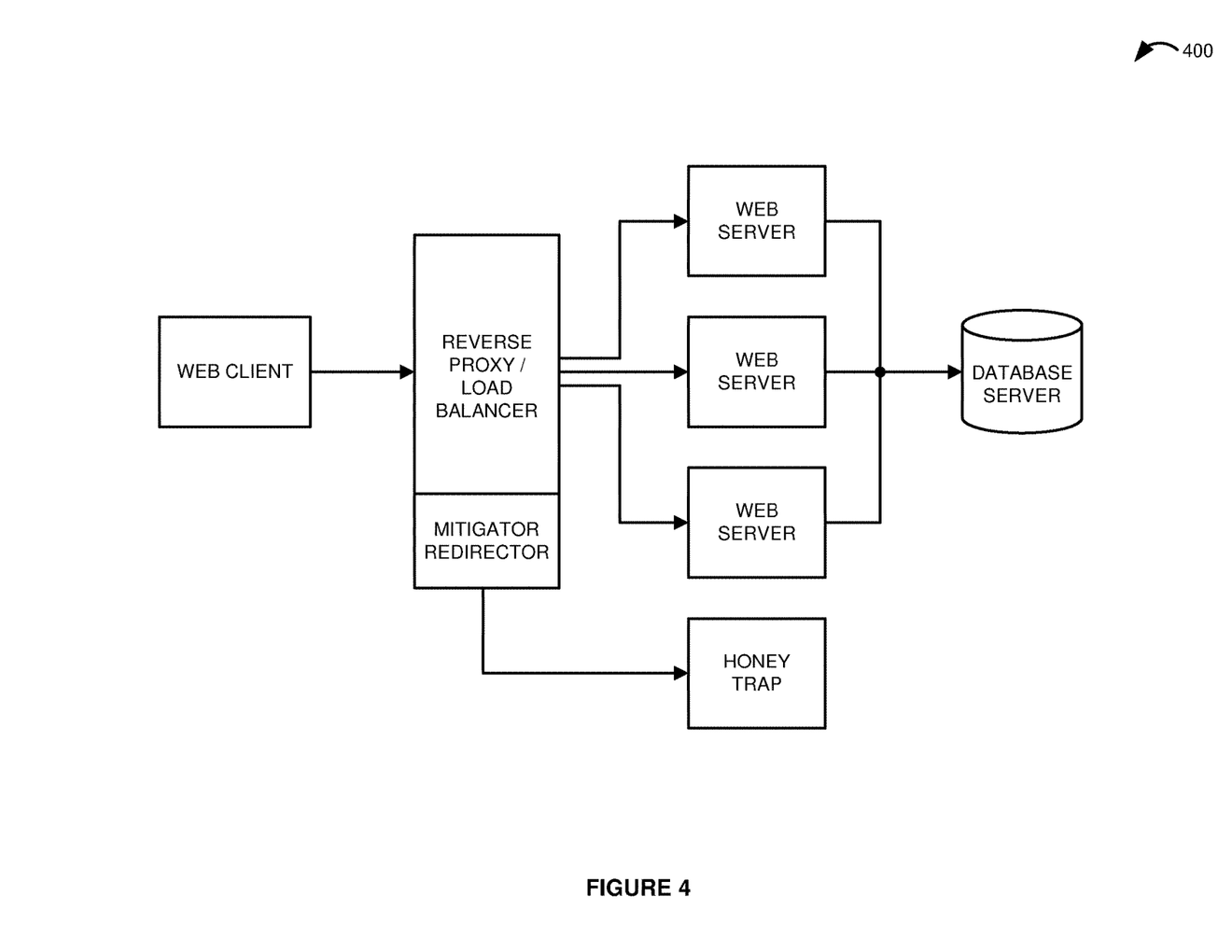
FIG. 4 is a block diagram that illustrates an operation of a communication system in an exemplary embodiment.

FIG. 4 is a block diagram that illustrates of an operation of communication system 400 in an exemplary embodiment. Communication system 400 provides an example of communication system 100, although system 100 could use alternative configurations. The following operations could be executed by computing system 125 and other elements of communication system 100, and could also be combined with operation 200 of FIG. 2 in some implementations.

Communication system 400 includes a web client, a reverse proxy/load balancer, three web servers, a database, and a honey trap. The reverse proxy includes a mitigator redirector module. The mitigator redirector module provides an example of redirection system 130, although system 130 could use alterative configurations. Similarly, the honey trap module provides an example of mitigation server 150, although server 150 could use alternative configurations.

When malicious users launch automated attacks that attempt to take over user accounts, they may employ stolen credentials, create fraudulent accounts, reset passwords, scrape personally identifiable information, and attempt other harmful actions. Typically, these malicious actions are achieved by running a script, bot, or browser that parses the web pages that are presented in response to the above-mentioned automation activities. Web pages that are protected behind user credentials comprise static content and non-static content. Static content can be in the form of images, stylesheets, media content, and the like. Non-static content can be in the form of account information, past purchase history, personally identifiable information, personal health information, and other private data. When the automated attacks hit the website, traditional inline security technologies simply block the traffic from the originating IP address. However, this blocking action serves to tip off the malicious user to the mitigation effort, prompting the attacker to switch attack tools, or simply change the IP address used for the attack by switching to a different proxy server, VPN, cloud provider instance, or altering some other properties of the connection. Either way, the attack is resumed almost immediately, rendering the connection blocking techniques largely ineffective. However, by employing the mitigator redirector and honey trap modules, the techniques disclosed herein do not block the requests originating from automation attacks, but instead redirect them away from the web servers and continue to serve them with fake content without impacting the load on the real web servers and database.

The mitigator redirector can either operate as a standalone module or as a plugin to the reverse proxy or load balancer of a typical web application stack. For most regular interactions with the web site, the mitigator redirector acts as a pass-through device where the requests from the web client are sent to the regular web servers. However, based on self-derived and/or external intelligence, when the mitigator redirector detects malicious web traffic, it can send specific requests to the honey trap module instead of the real web servers. The web client does not receive any indication that the mitigator redirector exists or has started redirecting requests for web traffic identified as malicious to the honey trap. The other job of the mitigator redirector is to learn site-specific interactions of the web servers and feed them to the honey trap so that those behaviors can be mimicked by the honey trap module.

The honey trap module attempts to mimic the interaction of the web client with the web server in a manner that appears exactly like the interaction with the real web server, but achieves this by providing fake content that looks very similar to the real content. While performing this function, the honey trap module does not interact with the real web server or the database. In one example, a malicious user may execute a script that tries a set of stolen username and password combinations on a login page of a website and checks if each set of credentials led to a page that contains account information (successful login attempt) or a page that asks the user to try again (failed login attempt). Based on the page that is returned, the script determines if the credentials worked or not. The honey trap module works to trick the automation attack by serving false web content that mimics the interactions with the real web server, and also mimics different behaviors based on the web page. For example, the honey trap can mimic a failed and successful login for attacks that are repeatedly trying out a list of different credentials on the login page. In addition to mimicking the web server response, the honey trap module can also mimic the behavioral outcomes based on the attack type. For example, the honey trap can randomly serve some fake successful logins while serving fake failed logins when it detects the type of account verification attack activity described above. The attack tool that is parsing the pages that are being returned by the honey trap has no ability to identify that the content is artificial. The data generated by the attack, such as the login credentials identified as returning successful login pages, is actually useless, as it cannot be used to access the real web server. Other examples of behaviors that can be mimicked by the honey trap include a password reset function for a password reset page, a new account creation flow for an account registration page, a shopping cart checkout flow when someone tries to buy something on a website using automation, and any other interactions with a web page.

By utilizing the mitigator redirector to identify and redirect web requests associated with automation attacks to the honey trap module, the web servers and database are protected from fraudulent transactions with the web service, DDoS attacks, and other malicious behavior. Additionally, by serving fake web content that mimics the responses expected from the real web server, the honey trap module works to fool the attackers into thinking that their attempts were successful, so they are less likely to alter their attack methodology, thereby facilitating the attack mitigation effort. In this manner, the honey trap module provides an effective tool to thwart malicious web service attacks. An exemplary operation of communication system 400 will now be discussed with respect to FIG. 5.

Figure 5:
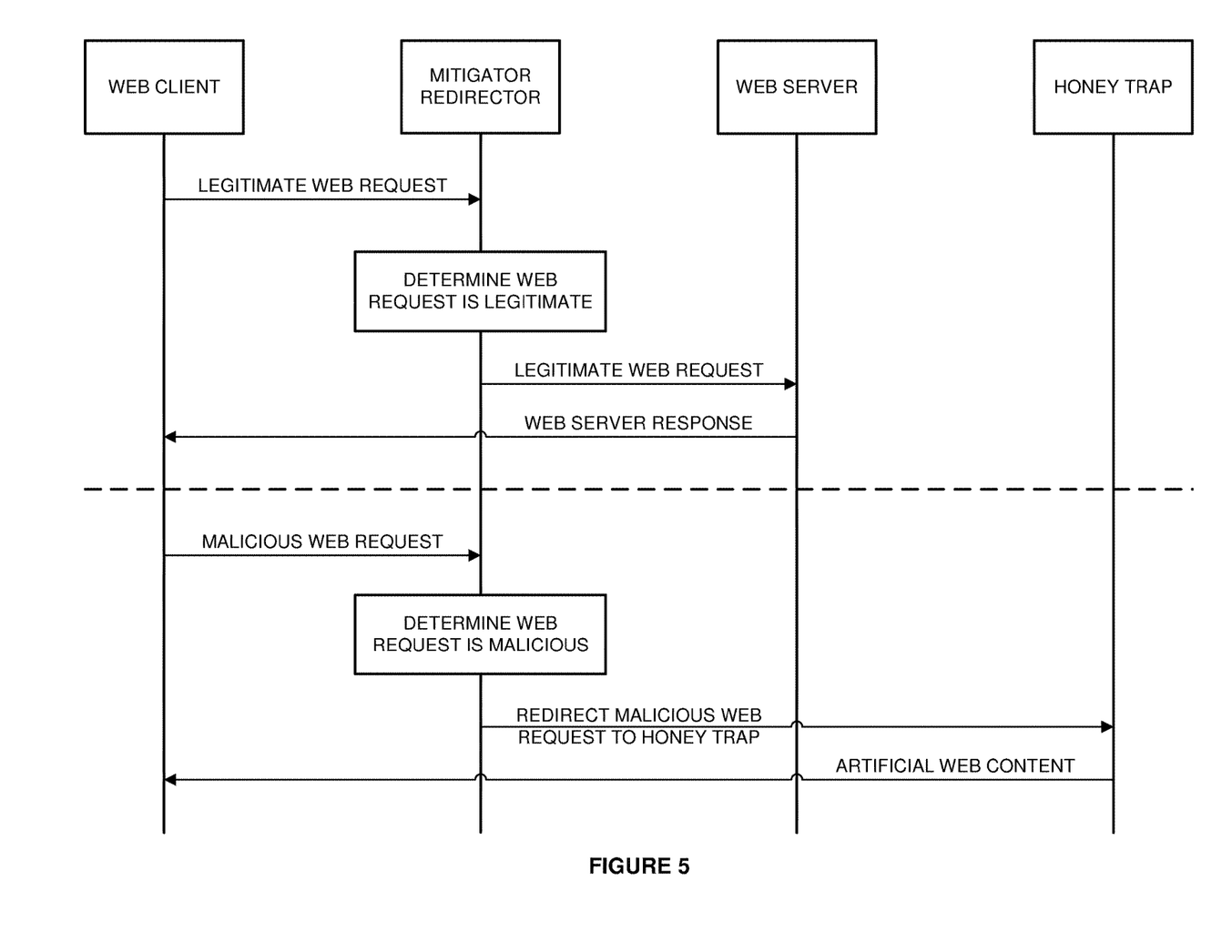
FIG. 5 is a sequence diagram that illustrates an operation of a communication system in an exemplary embodiment.

FIG. 5 is a sequence diagram that illustrates an operation of communication system 400 in an exemplary embodiment. Initially, the web client issues a legitimate web request to the web server, such as a user login with valid credentials. The web request is intercepted by the mitigator redirector and properties associated with the request are analyzed to decide if the request is legitimate. In this case, the mitigator redirector determines that the web request is legitimate and forwards legitimate the web request to the web server. The web server then processes the legitimate web request in the usual manner and provide a response to the web client, such as authorizing the user login attempt and providing a user account home page.

At a later point in time, as indicated by the dashed line appearing on FIG. 5, the web client attempts to send a malicious web request to the web server. The malicious web request is intercepted by the mitigator redirector and properties associated with the request are analyzed to decide if the request is legitimate or malicious. For example, the mitigator redirector could identify whether or not the web request is malicious by analyzing information associated with the web request and/or the web client computing system that made the request in order to identify the web request as malicious. The determination of whether the web request is legitimate or malicious could be based on several different criteria and considerations. For example, the mitigator redirector could identify whether or not the web request is malicious by processing connection-level information, HTTP headers associated with the web request, cipher suites. IP address whitelists, blacklists, regular expressions, fingerprints of behavior, data models, or any other information that may be matched against similar traffic can also be employed by the mitigator redirector in identifying malicious requests.

In this case, the mitigator redirector determines that the web request is malicious. Accordingly, the malicious web request is not allowed to reach the actual web server, but is instead redirected to the honey trap module. The malicious web request is then analyzed by the honey trap module to generate artificial content based on the web request that appears to be genuine content provided by the web server, and serves the artificial content to the web client in response to the malicious web request. In some examples, the honey trap could process the malicious web request to generate the artificial content based on a type of web page targeted by the web request, a type of attack associated with the malicious web request, an identification of an attack tool used to deploy the malicious web request, or any other criteria.

Advantageously, the honey trap module works to trick the automation attack by serving false web content that mimics the interactions with the real web server, and also mimics different behaviors based on the web page. In addition to mimicking the web server response, the honey trap module can also mimic the behavioral outcomes based on the attack type. The attack tool that is parsing the pages that are being returned by the honey trap has no ability to identify that the content is artificial and therefore useless to the attacker. By utilizing the mitigation techniques disclosed herein, websites do not need to block web requests coming from automation attacks. Instead, these malicious web requests can still be served with fake content from the honey trap module, without interacting with or impacting the load on the real web servers and database systems.

Now referring back to FIG. 1, client computing system 101 comprises a processing system and communication transceiver. Client computing system 101 may also include other components such as a user interface, data storage system, and power supply. Client computing system 101 may reside in a single device or may be distributed across multiple devices. Examples of client computing system 101 include mobile computing devices, such as cell phones, tablet computers, laptop computers, notebook computers, and gaming devices, as well as any other type of mobile computing devices and any combination or variation thereof. Examples of client computing system 101 also include desktop computers, server computers, and virtual machines, as well as any other type of computing system, variation, or combination thereof.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, asynchronous transfer mode (ATM) networks, packet networks, local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, or some other communication format, including combinations thereof. In some examples, communication network 120 includes further access nodes and associated equipment for providing communication services to several computer systems across a large geographic region.

Redirection system 130 may be representative of any computing apparatus, system, or systems that may connect to another computing system over a communication network. Redirection system 130 comprises a processing system and communication transceiver. Redirection system 130 may also include other components such as a router, server, data storage system, and power supply. Redirection system 130 may reside in a single device or may be distributed across multiple devices. Redirection system 130 may be a discrete system or may be integrated within other systems, including other systems within communication system 100. In some examples, redirection system 130 could include mitigation server 150. Some examples of redirection system 130 include desktop computers, server computers, cloud computing platforms, and virtual machines, as well as any other type of computing system, variation, or combination thereof. In some examples, redirection system 130 could comprise a network security appliance, firewall, reverse proxy, load balancer, intrusion prevention system, web application firewall, web server, network switch, router, switching system, packet gateway, network gateway system, Internet access node, application server, database system, service node, or some other communication system, including combinations thereof.

Web server 140 may be representative of any computing apparatus, system, or systems that may connect to another computing system over a communication network. Web server 140 comprises a processing system and communication transceiver. Web server 140 may also include other components such as a router, server, data storage system, and power supply. Web server 140 may reside in a single device or may be distributed across multiple devices. Web server 140 may be a discrete system or may be integrated within other systems, including other systems within communication system 100. Some examples of web server 140 include desktop computers, server computers, cloud computing platforms, and virtual machines, as well as any other type of computing system, variation, or combination thereof.

Database 145 may be representative of any computing apparatus, system, or systems that may connect to another computing system over a communication network. Database 145 comprises a data storage system and communication transceiver. Database 145 may also include other components such as a processing system, router, server, and power supply. Database 145 may reside in a single device or may be distributed across multiple devices. Database 145 may be a discrete system or may be integrated within other systems, including other systems within communication system 100. Some examples of database 145 include desktop computers, server computers, cloud computing platforms, and virtual machines, as well as any other type of computing system, variation, or combination thereof.

Mitigation server 150 may be representative of any computing apparatus, system, or systems that may connect to another computing system over a communication network. Mitigation server 150 comprises a processing system and communication transceiver. Mitigation server 150 may also include other components such as a router, server, data storage system, and power supply. Mitigation server 150 may reside in a single device or may be distributed across multiple devices. Mitigation server 150 may be a discrete system or may be integrated within other systems, including other systems within communication system 100. In some examples, mitigation server 150 could include redirection system 130. Some examples of mitigation server 150 include desktop computers, server computers, cloud computing platforms, and virtual machines, as well as any other type of computing system, variation, or combination thereof. In some examples, mitigation server 150 could comprise a network security appliance, firewall, reverse proxy, load balancer, intrusion prevention system, web application firewall, web server, network switch, router, switching system, packet gateway, network gateway system, Internet access node, application server, database system, service node, or some other communication system, including combinations thereof.

Communication links 111, 121, 131, 141, and 151 use metal, air, space, optical fiber such as glass or plastic, or some other material as the transport medium—including combinations thereof. Communication links 111, 121, 131, 141, and 151 could use various communication protocols, such as TDM, IP, Ethernet, telephony, optical networking, hybrid fiber coax (HFC), communication signaling, wireless protocols, or some other communication format, including combinations thereof. Communication links 111, 121, 131, 141, and 151 could be direct links or may include intermediate networks, systems, or devices.

Figure 6:
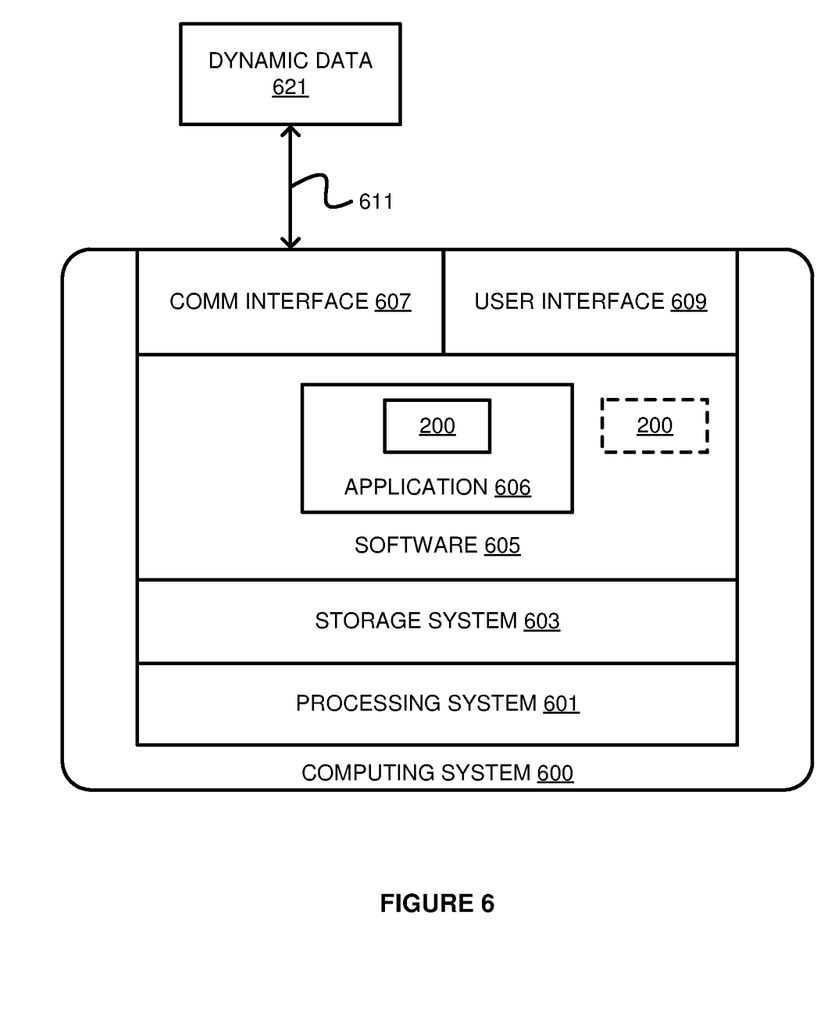
FIG. 6 is a block diagram that illustrates a computing system in an exemplary embodiment.

Referring now to FIG. 6, a block diagram that illustrates computing system 600 in an exemplary implementation is shown. Computing system 600 provides an example of redirection system 130, mitigation server 150, or any computing system that may be used to execute mitigation process 200 or variations thereof, although such systems could use alternative configurations. Computing system 600 includes processing system 601, storage system 603, software 605, communication interface 607, and user interface 609. Software 605 includes application 606 which itself includes mitigation process 200. Mitigation process 200 may optionally be implemented separately from application 606.

Computing system 600 may be representative of any computing apparatus, system, or systems on which application 606 and mitigation process 200 or variations thereof may be suitably implemented. Examples of computing system 600 include mobile computing devices, such as cell phones, tablet computers, laptop computers, notebook computers, and gaming devices, as well as any other type of mobile computing devices and any combination or variation thereof. Note that the features and functionality of computing system 600 may apply as well to desktop computers, server computers, and virtual machines, as well as any other type of computing system, variation, or combination thereof.

Computing system 600 includes processing system 601, storage system 603, software 605, communication interface 607, and user interface 609. Processing system 601 is operatively coupled with storage system 603, communication interface 607, and user interface 609. Processing system 601 loads and executes software 605 from storage system 603. When executed by computing system 600 in general, and processing system 601 in particular, software 605 directs computing system 600 to operate as described herein for mitigation process 200 or variations thereof. Computing system 600 may optionally include additional devices, features, or functionality not discussed herein for purposes of brevity.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 603 may comprise any computer-readable storage media capable of storing software 605 and readable by processing system 601. Storage system 603 may include volatile and nonvolatile, removable and non-removable media implemented in any method or technology for storage of information, such as computer readable instructions, data structures, program modules, or other data. Storage system 603 may be implemented as a single storage device but may also be implemented across multiple storage devices or sub-systems co-located or distributed relative to each other. Storage system 603 may comprise additional elements, such as a controller, capable of communicating with processing system 601. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, processing system 601 loads and executes portions of software 605, such as mitigation process 200, to facilitate prevention of malicious attacks on a web service.

Software 605 may be implemented in program instructions and among other functions may, when executed by computing system 600 in general or processing system 601 in particular, direct computing system 600 or processing system 601 to intercept a web request directed to a web server providing the web service and identify whether or not the web request is malicious. Software 605 may further direct computing system 600 or processing system 601 to, when the web request is identified as malicious, redirect the web request to an isolated mitigation server configured to mimic responses of the web server. Further, software 605 may direct computing system 600 or processing system 601 to process the web request to generate artificial content based on the web request that appears to be genuine content provided by the web server, and present the artificial content in response to the web request.

In some implementations, software 605 could comprise a mitigator redirector software module that intercepts a web request directed to a web server providing a web service, identifies whether or not the web request is malicious, and when the web request is identified as malicious, redirect the web request to a honey trap module configured to mimic responses of the web server. Software 605 could also comprise the honey trap software module that receives the web request from the mitigator redirector software module, processes the web request to generate artificial content based on the web request that appears to be genuine content provided by the web server, and presents the artificial content in response to the web request.

Software 605 may include additional processes, programs, or components, such as operating system software or other application software. Examples of operating systems include Windows®, iOS®, and Android®, as well as any other suitable operating system. Software 605 may also comprise firmware or some other form of machine-readable processing instructions executable by processing system 601.

In general, software 605 may, when loaded into processing system 601 and executed, transform computing system 600 overall from a general-purpose computing system into a special-purpose computing system customized to facilitate prevention of malicious attacks on a web service as described herein for each implementation. For example, encoding software 605 on storage system 603 may transform the physical structure of storage system 603. The specific transformation of the physical structure may depend on various factors in different implementations of this description. Examples of such factors may include, but are not limited to the technology used to implement the storage media of storage system 603 and whether the computer-readable storage media are characterized as primary or secondary storage.

In some examples, if the computer-readable storage media are implemented as semiconductor-based memory, software 605 may transform the physical state of the semiconductor memory when the program is encoded therein. For example, software 605 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 600 is generally intended to represent a computing system with which software 605 is deployed and executed in order to implement application 606 and/or mitigation process 200 (and variations thereof). However, computing system 600 may also represent any computing system on which software 605 may be staged and from where software 605 may be distributed, transported, downloaded, or otherwise provided to yet another computing system for deployment and execution, or yet additional distribution. For example, computing system 600 could be configured to deploy software 605 over the internet to one or more client computing systems for execution thereon, such as in a cloud-based deployment scenario.

Communication interface 607 may include communication connections and devices that allow for communication between computing system 600 and other computing systems (not shown) or services, over a communication network 611 or collection of networks. In some implementations, communication interface 607 receives dynamic data 621 over communication network 611. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface 609. In some examples, user interface 609 could include a touch screen capable of displaying a graphical user interface that also accepts user inputs via touches on its surface. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface. User interface 609 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to facilitate prevention of malicious attacks on a web service, the method comprising:
  interacting with a web server to observe and learn legitimate response behavior of the web server;
  providing the legitimate response behavior of the web server to an isolated mitigation server configured to mimic responses of the web server based on the legitimate response behavior of the web server;
  intercepting a web request from a client directed to the web server;
  identifying whether or not the web request is malicious;
  when the web request is identified as malicious, preventing the web request from reaching the web server and instead redirecting the web request to the isolated mitigation server;
  in the isolated mitigation server, processing the web request with the legitimate response behavior of the web server to dynamically generate artificial content that mimics the legitimate response behavior of the web server based on a type of web page targeted by the web request; and
  presenting, by the isolated mitigation server, the artificial content to the client in response to the web request.

2. The method of claim 1 wherein the type of web page targeted by the web request comprises a password reset page, and wherein processing the web request to dynamically generate the artificial content based on the type of web page targeted by the web request comprises processing the web request to dynamically generate the artificial content that mimics the password reset page that would be served by the web server in response to the web request.

3. The method of claim 1 wherein processing the web request to dynamically generate the artificial content comprises generating the artificial content based on an attack type associated with the web request.

4. The method of claim 3 wherein the attack type associated with the web request comprises a credential attack, and wherein generating the artificial content based on the attack type comprises generating a false successful login page.

5. The method of claim 1 further comprising filling in one or more data values in a page template associated with the web page targeted by the web request with false information to dynamically generate the artificial content, wherein the page template comprises a page structure of the web page targeted by the web request that identifies one or more areas where the one or more data values may be filled in with the false information.

6. The method of claim 1 wherein the type of web page targeted by the web request comprises an account registration page, and wherein processing the web request to dynamically generate the artificial content based on the type of web page targeted by the web request comprises processing the web request to dynamically generate the artificial content that mimics a new account creation flow for the account registration page.

7. The method claim 1 wherein processing the web request to dynamically generate the artificial content comprises generating the artificial content based on an identification of an attack tool associated with the web request.

8. A network security system to facilitate prevention of malicious attacks on a web service, the system comprising:
  a redirection system; and
  an isolated mitigation server;
  the redirection system configured to interact with a web server to observe and learn legitimate response behavior of the web server and provide the legitimate response behavior of the web server to the isolated mitigation server configured to mimic responses of the web server based on the legitimate response behavior of the web server;
  the redirection system further configured to intercept a web request from a client directed to the web server, identify whether or not the web request is malicious, and when the web request is identified as malicious, prevent the web request from reaching the web server and instead redirect the web request to the isolated mitigation server;
  the isolated mitigation server configured to process the web request with the legitimate response behavior of the web server to dynamically generate artificial content that mimics the legitimate response behavior of the web server based on a type of web page targeted by the web request; and
  the isolated mitigation server further configured to present the artificial content to the client in response to the web request.

9. The network security system of claim 8 wherein the type of web page targeted by the web request comprises a password reset page, and wherein the isolated mitigation server configured to process the web request to dynamically generate the artificial content based on the type of web page targeted by the web request comprises the isolated mitigation server configured to process the web request to dynamically generate the artificial content that mimics the password reset page that would be served by the web server in response to the web request.

10. The network security system of claim 8 wherein the isolated mitigation server configured to process the web request to dynamically generate the artificial content comprises the isolated mitigation server configured to generate the artificial content based on an attack type associated with the web request.

11. The network security system of claim 10 wherein the attack type associated with the web request comprises a credential attack, and wherein the isolated mitigation server configured to generate the artificial content based on the attack type comprises the isolated mitigation server configured to generate a false successful login page.

12. The network security system of claim 8 wherein the isolated mitigation server is further configured to fill in one or more data values in a page template associated with the web page targeted by the web request with false information to dynamically generate the artificial content, and wherein the page template comprises a page structure of the web page targeted by the web request that identifies one or more areas where the one or more data values may be filled in with the false information.

13. The network security system of claim 8 wherein the wherein the type of web page targeted by the web request comprises an account registration page, and wherein the isolated mitigation server configured to process the web request to dynamically generate the artificial content based on the type of web page targeted by the web request comprises the isolated mitigation server configured to process the web request to dynamically generate the artificial content that mimics a new account creation flow for the account registration page.

14. An apparatus comprising:
one or more non-transitory computer-readable storage media;
a processing system operatively coupled with the one or more computer-readable storage media; and program instructions stored on the one or more computer-readable storage media that, when executed by the processing system, direct the processing system to at least:
interact with a web server to observe and learn legitimate response behavior of the web server;
provide the legitimate response behavior of the web server to an isolated mitigation server module configured to mimic responses of the web server based on the legitimate response behavior of the web server;
intercept a web request from a client directed to the web server providing a web service;
identify whether or not the web request is malicious;
when the web request is identified as malicious, prevent the web request from reaching the web server and instead redirect the web request to the isolated mitigation server module, in the isolated mitigation server module, process the web request with the legitimate response behavior of the web server to dynamically generate artificial content that mimics legitimate response behavior of the web server based on a type of web page targeted by the web request, and present the artificial content to the client in response to the web request.

15. The apparatus of claim 14 wherein the type of web page targeted by the web request comprises a password reset page, and wherein the program instructions direct the processing system to process the web request to dynamically generate the artificial content based on the type of web page targeted by the web request by directing the processing system to process the web request to dynamically generate the artificial content that mimics the password reset page that would be served by the web server in response to the web request.

16. The apparatus of claim 14 wherein the program instructions direct the processing system to process the web request to dynamically generate the artificial content by directing the processing system to generate the artificial content based on an attack type associated with the web request.

17. The apparatus of claim 16 wherein the attack type associated with the web request comprises a credential attack, and wherein the program instructions direct the processing system to generate the artificial content based on the attack type by directing the processing system to generate a false successful login page.

18. The apparatus of claim 14 wherein the program instructions further direct the processing system to fill in one or more data values in a page template associated with the web page targeted by the web request with false information to dynamically generate the artificial content, and wherein the page template comprises a page structure of the web page targeted by the web request that identifies one or more areas where the one or more data values may be filled in with the false information.

19. The apparatus of claim 14 wherein the type of web page targeted by the web request comprises an account registration page, and wherein the program instructions direct the processing system to process the web request to dynamically generate the artificial content based on the type of web page targeted by the web request by directing the processing system to process the web request to dynamically generate the artificial content that mimics a new account creation flow for the account registration page.

20. One or more non-transitory computer-readable storage media to facilitate prevention of malicious attacks on a web service, comprising:
first program instructions stored on the one or more computer-readable storage media that, when executed by a computing system, direct the computing system to at least:
interact with a web server to observe and learn legitimate response behavior of the web server;
provide the legitimate response behavior of the web server to an isolated mitigation server configured to mimic responses of the web server based on the legitimate response behavior of the web server;
intercept a web request from a client directed to the web server;
identify whether or not the web request is malicious; and
when the web request is identified as malicious, prevent the web request from reaching the web server and instead redirect the web request to an isolated mitigation server; and
second program instructions stored on the one or more computer-readable storage media that, when executed by the isolated mitigation server, direct the isolated mitigation server to at least: process the web request with the legitimate response behavior of the web server to dynamically generate artificial content that mimics the legitimate response behavior of the web server based on a type of web page targeted by the web request; and present the artificial content to the client in response to the web request.

* * * * *

UNITED STATES PATENT AND TRADEMARK OFFICE
CERTIFICATE OF CORRECTION

| | | |
|---|---|---|
| PATENT NO. | : 11,483,345 B2 | Page 1 of 1 |
| APPLICATION NO. | : 15/835765 | |
| DATED | : October 25, 2022 | |
| INVENTOR(S) | : Michael Barrett et al. | |

It is certified that error appears in the above-identified patent and that said Letters Patent is hereby corrected as shown below:

In the Claims

Column 17, Line 24, Claim 14, after "tion server module" delete "," and add ";"

Signed and Sealed this
Twenty-eighth Day of May, 2024

*Katherine Kelly Vidal*

Katherine Kelly Vidal
*Director of the United States Patent and Trademark Office*